Figure 3:
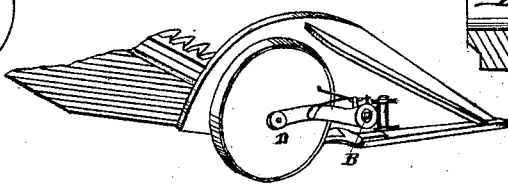

J. D. Wright,
Harvester Cutter.
No. 109,481.   Patented Nov. 22, 1870.
Fig. 1 — 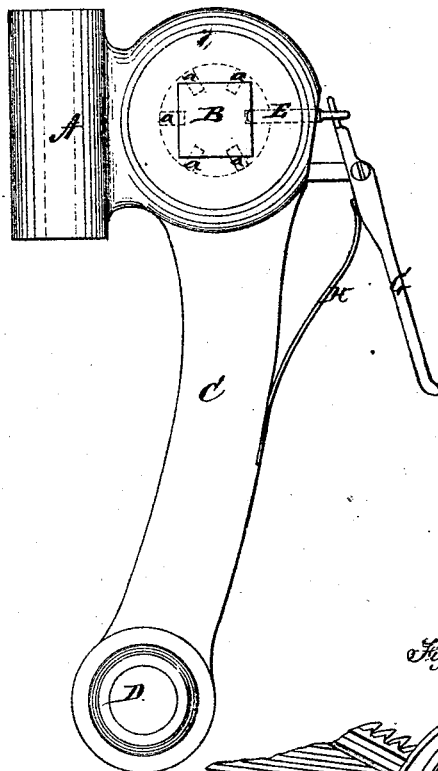
Fig. 2 — 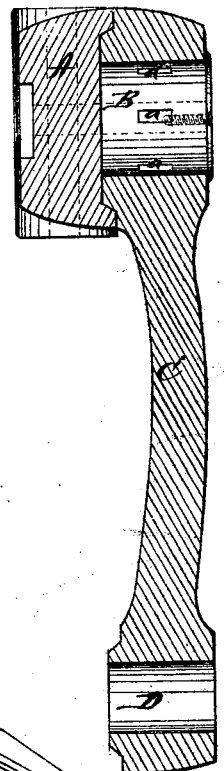

Witnesses:
Chas Jacobs
J. V. White
Inventor:
J. D. Wright
Per
T. H. Alexander
Atty.

UNITED STATES PATENT OFFICE.

JAMES D. WRIGHT, OF COLUMBIA, TENNESSEE.

IMPROVEMENT IN MEANS FOR ADJUSTING THE GRAIN-WHEELS OF HARVESTERS.

Specification forming part of Letters Patent No. 109,481, dated November 22, 1870.

*To all whom it may concern:*

Be it known that I, JAMES D. WRIGHT, of Columbia, in the county of Maury and State of Tennessee, have invented certain new and useful Improvements in Harvester-Arms; and I do hereby declare that the following is a full, clear, and exact description thereof, reference being had to the accompanying drawing, and to the letters of reference marked thereon, which form a part of this specification.

The nature of my invention consists in the construction and arrangement of devices for adjusting a harvester grain-wheel so that the same may be used to adjust the cutter-bar to any height desired.

In order to enable others skilled in the art to which my invention appertains to make and use the same, I will now proceed to describe its construction and operation, referring to the annexed drawing, in which—

Figure 1 is a side view, and Fig. 2 a transverse vertical section, of the grain-wheel arm. Fig. 3 is a section of a harvester with the arm attached, showing the manner of using the same.

A represents a hinge, which is attached to the divider-board of a harvester by means of a staple-bolt. To this piece A the arm C is pivoted by means of a bolt, B, which thus enables the arm to be placed at any angle with the ground, in addition to its being capable of moving outward from the harvester by means of the hinge A. The grain-wheel is attached to the lower end of the arm C at the bolt-hole D.

The bolt B, where it passes through the upper end of the arm C, is provided with mortises *a a*, in which the key E works. This key is operated by the lever G, and a spring, H, bears on said lever to force the key into the mortises on the bolt B. By this means the arm C, with the grain-wheel, may be adjusted so as to run the cutter-bar at any height desired from the ground.

Having thus fully described my invention, what I claim as new, and desire to secure by Letters Patent, is—

The devices herein described for adjusting the grain-wheel of a harvester, consisting of arm C, bolt B, spring-pawl E, and hinge A, all arranged substantially in the manner set forth.

In testimony that I claim the foregoing as my own I affix my signature in presence of two witnesses.

J. D. WRIGHT.

Witnesses:
    JAMES ANDREWS,
    W. S. McGREGOR.